(12) United States Patent
Palaniappan

(10) Patent No.: US 6,711,557 B1
(45) Date of Patent: Mar. 23, 2004

(54) CLIENT-BASED BACKGROUND UPDATE MONITORING

(75) Inventor: Murugappan Palaniappan, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 792 days.

(21) Appl. No.: 09/639,583

(22) Filed: Aug. 14, 2000

(51) Int. Cl.$^7$ ................................................ G06N 5/02
(52) U.S. Cl. ............................ 706/45; 707/10; 707/203
(58) Field of Search ......................... 706/45; 707/10, 707/203; 709/203, 206, 209

(56) References Cited

PUBLICATIONS

Demet Aksoy, Michael Franklin, RxW: a scheduling approach for large scale on demand data broadcast, IEEE/ACM Transactions on Networking (TON), vol. 7 Issue 6, Dec. 1999, pp. 846–860.*

Mei Kobayashi, Koichi Takeda, Information retrieval on the web, ACM Computing Surveys (CSUR), vol. 32 Issue Jun. 2000, pp. 144–173.*

Manfred Hauswirth, Mehdi Jazayeri, A component and communication model for push systems, ACM SIGSOFT Software Engineering Notes, Proceedings of the 7th European engineering conference held jointly with the 7th ACM SIGSOFT international symposium on Founda.*

Huang, Y. W.; Yu, P.S.; A bandwidth sensitive update scheduling method for Internet push, Distributed Computing Systems, 1998. Proceedings. 18th International Conference on 26 May 29, 1998, page(s): 303 310.* http://www.msdn.microsoft.com/workshop—Software Update Channels.

* cited by examiner

*Primary Examiner*—Wilbert L. Starks, Jr.
(74) *Attorney, Agent, or Firm*—Fish & Richardson P.C.

(57) ABSTRACT

Methods and apparatus for client-based monitoring of remote servers for computer program component updates. A client process periodically downloads meta-information to determine whether any update is available for any program application that has registered with the monitoring process. The client process maintains a local database of information about registered applications. If an update is available, the application to which the update relates can cause the update to be downloaded and installed. Each participating application may use a common, shared, self-updating component to interact with the updating process.

25 Claims, 3 Drawing Sheets

CLIENT-BASED BACKGROUND UPDATE MONITORING

BACKGROUND

This invention relates to updating computer software and data.

Although computer program components are frequently upgraded and improved, ensuring that users have access to updates can be difficult. Currently, when new or updated library or content files are available, the information is posted to web sites or sent to users on a compact disk (CD) or other traditional media.

When an update is available over the Internet, the user must generally access the relevant web site (i.e., site on the World Wide Web), choose to download an installer application and then run the installer. The user typically lets the installer determine whether or not any new material is applicable to the user's machine. When an update is available on traditional media such as a CD, the same process is required, except there is no downloading step. There are a number of problems with the current method for providing users with software updates. First, users must know when an update is available and how to obtain the update. Second, once users become aware that an update is available, they may be unsure of whether or not they need the proffered update and may go through the time consuming process of running the installer program without any need to do so. Third, providing updates on traditional media has its own problems: most importantly, the significant cost of manufacturing and distributing the updates to users.

A different technique to download and install new versions of software is implemented by Microsoft® Software Update Channels. These are specialized web browser channels that a vendor can use to notify users of software updates and also deliver and install the updates on the users' computers. A Microsoft channel is a web site described by a Channel Definition Format (CDF) file. CDF is an Extensible Markup Language (XML) vocabulary, or XML-based data format, which can be used to organize a set of related Web resources. A CDF file provides a description of the resources in a channel—describing how resources in the channel will be used or displayed, for example, and how frequently the channel should be monitored for updates. The CDF file for a Software Update Channel identifies the current version number of the vendor's software and defines the channel. Microsoft® Internet Explorer 4.0 and later can monitor CDF files for changes. When changes to the software's version number are discovered in a CDF file, Internet Explorer can notify the user that a new version of the vendor's software is available. A CDF file can also contain details like the unique name of the software, hardware configurations the software will run on, and the location of the distribution unit. A CDF file may also define a schedule that Internet Explorer should use for update monitoring.

SUMMARY

In contrast, the present invention provides a technology in which an update mechanism operates in conjunction with each participating software application product, so that users receive notices of, and information about, updates to a product from the product itself. The invention features methods and apparatus that identify applicable updates for computer programs and for program components and content. An update can be any form of code or content packaged in one or more files. An update can be an updated version of material that already exists on the client machine or it can be a new material.

In general, in one aspect, the invention provides methods and apparatus, including computer program products, for providing updates for computer program components on a client machine that can be connected to web sites on the Internet. In this aspect, an update monitoring process running on a client machine maintains a local database of application-related information. The process can receive registration information from, and thereby register, multiple computer program applications installed on the client machine.

One or more servers remote from the client machine can communicate with the client machine over the Internet, and each server maintains meta-information concerning at least one of the multiple registered applications. The process executes periodically and at that time downloads from one or more of the servers, according to what applications are registered with the process, meta-information specifying what are the current versions of all components each registered application requires. The process also compares the downloaded meta-information with information obtained on the client machine to identify any registered application for which an update should be performed and sends a notification that an update should be performed to each identified application. The registered applications have programming that can receive a notification from the process running on the client machine and to cause an update to be performed in response to the notification.

Apparatus implementing techniques of the invention can include a programmed computer or a computer program product tangibly embodied in a machine-readable storage device for execution by a programmable processor.

Advantages that may be seen in particular implementations of the invention include one or more of the following. Updating can be accomplished without uploading any data from the client machine to any other computer. This helps to maintain the privacy of the client machine and the user. Any application, including a shrink-wrapped application, can easily be configured with a shared library component that links the application with a common, client-side, update monitoring process. An application can specify where its meta-information can be found on the Internet. An application can display update information to a user within the context of the application itself.

The details of one or more embodiments of the invention are set forth in the accompanying drawings and the description below. Other features, objects, and advantages of the invention will be apparent from the description and drawings and from the claims.

DESCRIPTION OF DRAWINGS

Like reference symbols in the various drawings indicate like elements.

DETAILED DESCRIPTION

Figure 1:
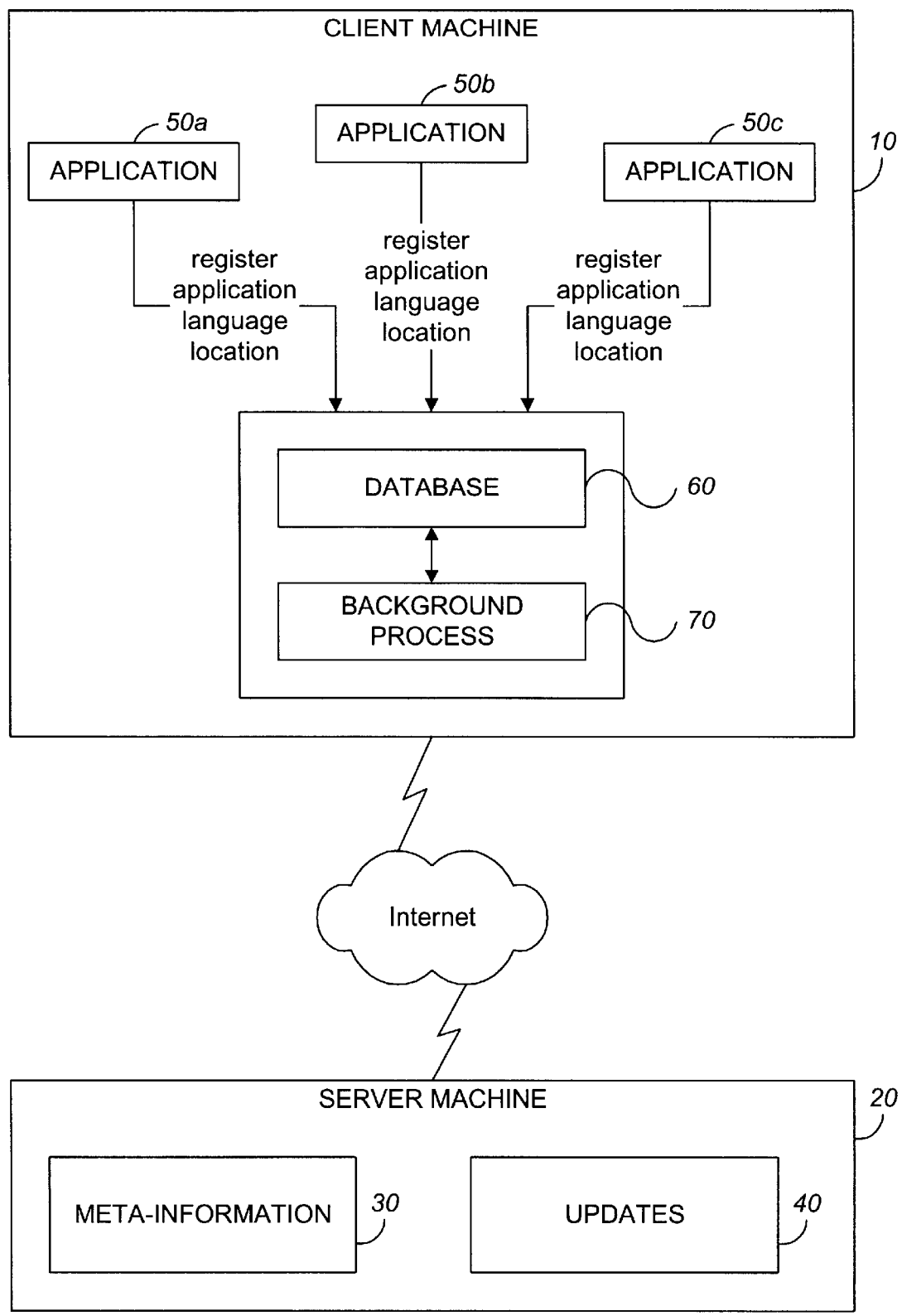
FIG. 1 illustrates the relationship between applications, a client machine, and a server machine in accordance with the invention.

As shown in FIG. 1, one or more applications 50 (shown as 50a, 50b, . . . ) that support client-based update monitoring are installed on client machine 10 and register themselves with an update monitoring process 70 that runs in the background on the client machine. The applications 50 (or their installation processes) each register with the monitoring process, causing an entry to be added to a client-machine-resident database 60 identifying the application, the language of the application (such as English or French), and the location on the client machine of the one or more components of the application. In one implementation, the resident database is simply a data file that stores the information about the participating applications in Extensible Markup Language (XML) format. However, the database can be stored and maintained using a data base management system or any other convenient technology. The resident database can be stored on any non-volatile memory local to the client machine, such as on a disk drive directly connected to the client machine or on a disk drive that is local to the client machine, for example, a disk drive in a server coupled to the client machine by a local area network. Similarly, the applications 50 can be installed on a drive directly connected to the client machine or on a server on a local area network.

Registered applications 50 include or invoke programming that implements registration and other features of the updating process that will be described later. In one implementation, this common, client-side programming is in the form of a shared library, such as a Microsoft Windows™ dynamic link library (DLL). Generally, this shared component will include code that allows it to update itself, either automatically or in response to a user action. The shared component can make itself available to a user of an application by adding a command to a menu, such as the help menu of the application. Selecting the command causes a user interface window to open through which the user can set preferences and otherwise control operation of the update monitoring feature.

A server machine 20 supporting one or more applications has meta-information 30 for each supported application. The meta-information includes information about each application, the languages and platforms for which it is available, the current release, the components it may require and their versions, including system components and shared components, and any available updates. The meta-information can be stored in a data file and represented, for example, in XML format. The meta-information specifies a source from which available updates 40 can be downloaded. Updates can be served from any accessible server; however, it is often convenient to host updates on the server machine 20 itself. An update can be or include any component of an application, such as content or code. An update can be a single file or a package of files. For example, an update can be or include a library, an installer, a markup language file, a graphics file, a help file, or a tutorial file.

When an application registers with the background process 70, the application can specify—for example, with a URI (Uniform Resource Identifier) such as a URL (Locator) or UNR (Name)—where the meta-information for the application can be found. In this way, the process can support the applications of multiple vendors by obtaining and processing meta-information for each vendor separately. Alternatively, this information can be found by the background process on a known or default web site.

Figure 2:
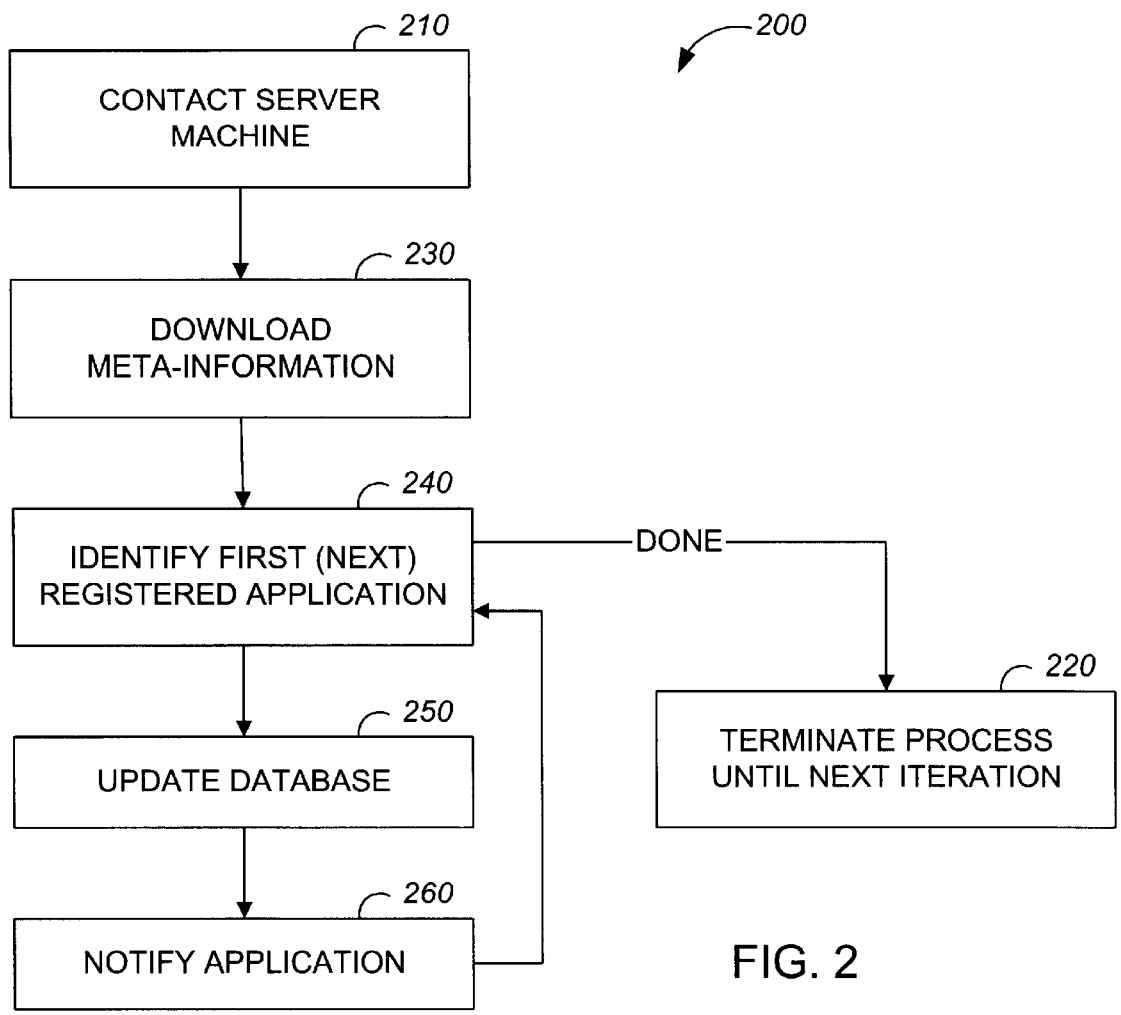
FIGS. 2 and 3 are flow diagrams for methods in accordance with the invention.

As shown in FIG. 2, the background process 70 (FIG. 1) on the client machine wakes up periodically and performs a procedure 200 that contacts the server machine (or some substitute, such as a mirror site) over the Internet (step 210). The event that wakes up the process can be the passage of a time interval or some other occurrence. Generally, a time interval will be set by a user, such as once a week after a particular time on a particular day of the week. The process downloads meta-information (step 230) from all web sites identified by registered applications, if any, or from a known or default site. In one implementation, the meta-information is downloaded in the form of an XML file that contains information about all applications participating the background updating process (whether or not they are registered on a particular client machine) that are known to the source web site. Alternatively, the information can be in the form of one or more XML files each specific to a particular vendor and containing information about the participating applications of the vendor.

The process looks for all matching applications, that is, for all registered applications that appear in the meta-information (step 240). For example, a match can be found when the {application, language, platform} triple for a participating application on the client matches an {application, language, platform} triple that appears in the meta-information. The client-resident database is updated for each matching application (step 250) to include the current meta-information for all registered applications. By comparing what the current information indicates should be installed with what is actually installed, the process determines whether an applicable update is available. In this context, an update may simply be a component of the application or a related system component, where the copy on the client machine is out of date or missing and so may need to be reinstalled. It should be noted that the concept of an update is not limited to files that are distributed by a vendor as update files, but may be parts of an original installation for a base version of an application, as well as system components that the application needs to have available to it.

In one implementation, available updates are handled by the application to which they relate. Thus, when the process determines that an update is available, the corresponding application is notified on the client machine (step 260). The background process can do this by setting a flag in the database that the application examines at a time selected by the application, such as when the application next is executed, by sending a message to the application, or otherwise. The application controls when to handle an available update and whether to ask the user before downloading and installing the update. One particular kind of update is a library file or other shared resource, which may be applicable to more than one application. The process determines if any new shared resources may be wanted for any of the registered applications and, if so, notifies each application.

After all matching applications have been handled, the process terminates until the next iteration (step 220).

Figure 3:
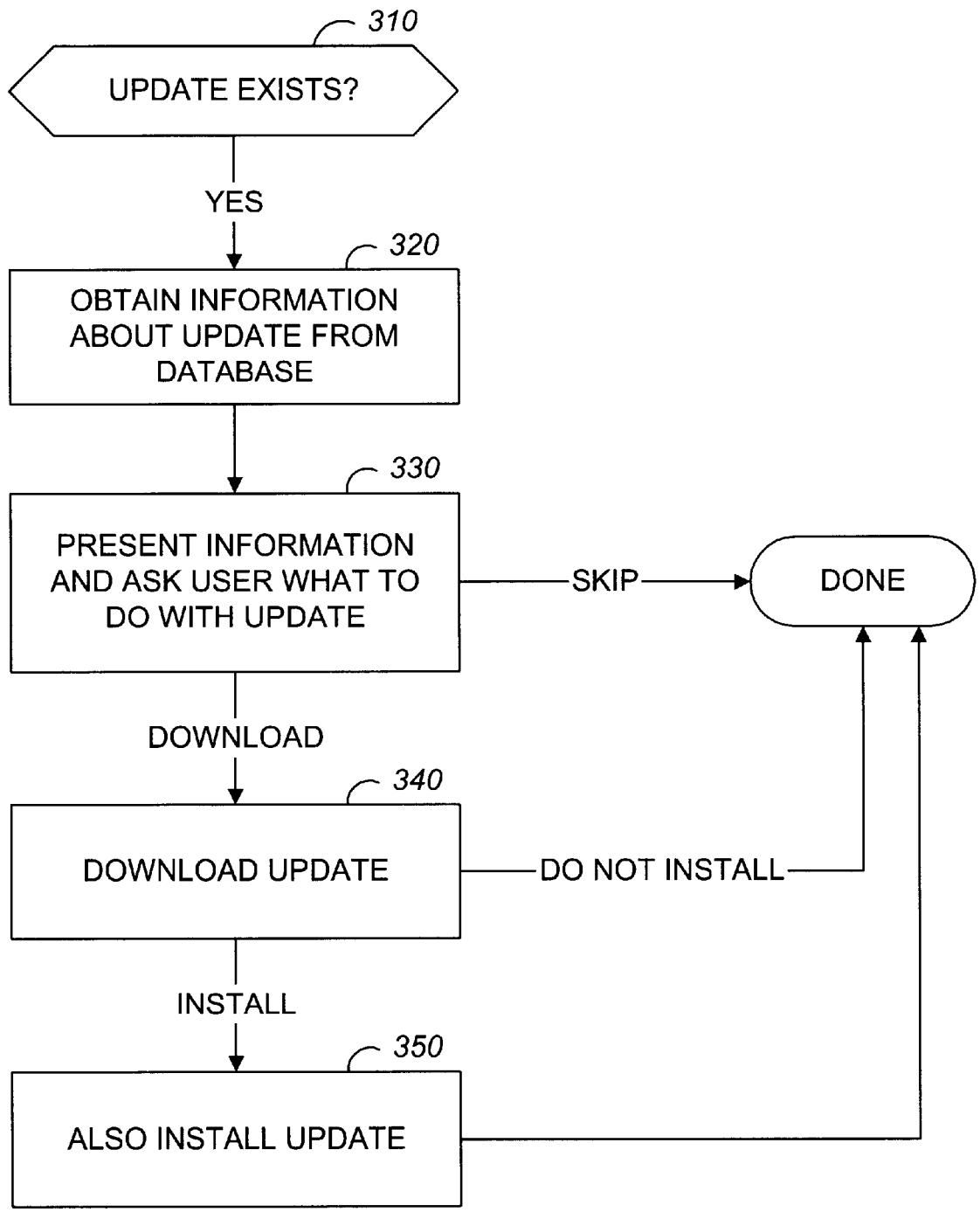

As shown in FIG. 3, in one implementation, if an update exists (step 310, "yes" branch), the application obtains a description and other information about the update from the database (step 320) and then presents descriptive information about the update to the user and asks the user whether to download, download and install, or skip the update (step 330). If the user requests a download, the application obtains the location of the update from the database and downloads the update (step 340). If the user requests download and install, the application also installs the update, or causes it to be installed (step 350). Otherwise, the process performed by the application is done. Installation can involve placing update files in an appropriate local application program file directory, for example, or running an installer program, or any other conventional installation process. The application can then update the database to indicate what the application has done, if anything. The background process can monitor the database, download updates, and start the installer, waiting until the application has quit, if necessary, before beginning the installation process. The background process can monitor the database and the client machine to confirm that each download process, once begun, was successfully completed, and cause it be restarted, if not.

Alternatively, either the background process or the application can be configured to download or install an update without user intervention or interaction. Whether to do either or both operations without user intervention or interaction, and whether they should be done by the background process or by the application, can be indicated in the meta-information or set by the user as a preference, which can be recorded in the database.

In this way, the background process operates as a background application that keeps a dynamic log of all applications participating in the automatic update scheme. An advantage of this technique and system is that any software application can add itself to the process by adding its information to the resident database, or be added by an installation process that does so.

The following table shows an illustrative portion of an XML file containing meta-information 30. In one implementation, a single XML file contains all the meta-information resident on the server and the version or date of the current components or updates that can be downloaded to the client machine. It is this XML file that is downloaded to the client machine periodically.

The following table provides description and explanation of attributes and values used in the preceding table.

| Attribute = value | Description |
| --- | --- |
| Category Value="4" | The category value refers to the content type; 4 indicates component/update. Other possible types include updates for the shared component itself, updates for technical support information such as help files and tutorials, and updates in the nature of news. |
| Product Name="InDesign" | indicates that this is the InDesign product description |
| Platform Name="mac" | indicates that this is the Mac platform description |
| MinOSVersion="Sys8" | indicates that the component/updates can be installed on Mac OS 8 and up |
| CategoryItem | indicates that a detailed documentation of one categoryitem follows |
| MinProductVersion="1.x" | indicates that the component can be installed on any version of the product version 1.0 and up |
| RegistrationRequired="1" | indicates that users must have registered the product to be notified of this |

```
<?xml verion="1.0">
<Category Value="4">
<Language Name="enu">
    <Product Name="InDesign">
        <Platform Name="mac" MinOSVersion="Sys8">
            <!-- Description of categoryitems goes here -->
            <!-- Each categoryitem represents one component or update -->
            <CategoryItem MinProductVersion="1.x" RegistrationRequired="1"
            InstallImmediate="1" InstallRestart="1" FileDestination=":Plug-
            ins:">
            <URL FileName="AGMPrint" FileSize="323" LMT="925838978"
            HREF="http://www.adobe.com/special/webenabled/plug-
            ins/mac/AGMPrint.hqx" />
            <DescriptionText Language="enu" ShortValue="Can print on non-
            postscript printers" LongValue="By installing this plug-in, you
            can print to any non-postscript printer. It has been tested on
            the HP and Apple LaserWriter printers. Works on Mac OS 8 and up.
            For further details, visit
            http://www.adobe.com/indesign/printers/agmprint1.3" />
            </CategoryItem>
        </Platform>
        <Platform Name="win32" >
            <!-- The MS Windows platform description goes here -->
        </Platform>
    </Product>
    <Product Name="AcroViewer">
        <!-- Components or updates for the AcroViewer product go here -->
    </Product>
    <Product Name="Photoshop">
        <!-- Components or updates for the Photoshop product go here -->
    </Product>
</Language>
<Language Name="fra">
    <!-- Information applicable to the French language of any product goes
    here -->
    <!-- The products listed here could be very different from those of the
    other languages -->
</Language>
<Language Name="jpn">
    <!-- Information applicable to the Japanese language of any product
    goes here -->
    <!-- The products listed here can be different from those of the other
    languages -->
</Language>
</Category>
```

-continued

| Attribute = value | Description |
| --- | --- |
| InstallImmediate="1" | component/update indicates that the component/update (after download) can be installed immediately without having to wait for InDesign to shut down first |
| InstallRestart="1" | indicates that after installation, the user should be prompted to restart the OS before the component/update installation can take effect |
| FileDestination= ":Plug-ins:" | identifies the path (relative to the InDesign executable) where the download file should be moved; this is applicable for single files and not installers |
| URL FileName | is the name of the component/update after it is downloaded |
| FileSize | is the size of the posted file in kilobytes; used during progress bar display during download |
| LMT | is the Last Modified Time of this component/update on the server - used to test for new-ness by comparing with similar file on client machine |
| HREF | is the server location of the component/update |
| DescriptionText Language | is the language of the short and long description text |
| ShortValue | is the description that appears to the user when first notified of the availability of this component/update |
| LongValue | is a long description for the user to make an informed decision whether to download the component/update |

Additional meta-information can be included. For example, an XML file can include (a) tags to identify that a component or update should be placed in a system folder, such as the System folder on a MacOS operating system or a windows or win32 folder on a Microsoft Windows operating system, and (b) tags to identify components or updates that are shared between many products, such as fonts and color profiles.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

A number of embodiments of the invention have been described. Nevertheless, it will be understood that various modifications may be made without departing from the spirit and scope of the invention. For example, software may be downloaded by accessing an FTP site or a bulletin board service or by connecting to a server directly over the public switched telephone network instead of accessing a web site over the Internet. The client machine can be any digital electronic device configured for program installation and execution, including, by way of example, desktop and laptop personal computers, personal digital assistants, and web-enabled mobile telephones. Accordingly, other embodiments are within the scope of the following claims.

What is claimed is:

1. A system for providing updates for computer program components on a client machine operable to be connected to web sites on the Internet, the system comprising:

an update monitoring process running on a client machine, the process maintaining a local database of application-related information, the process being operable to receive registration information from, and thereby register, multiple computer program applications installed on the client machine, the process maintaining received registration information in the local database; and one or more servers remote from the client machine, each server and being operable to communicate with the client machine over the Internet, each server maintaining meta-information concerning at least one of the multiple registered applications;

the update monitoring process further operating to execute periodically and at that time download from one or more of the servers, according to what applications are registered with the process, meta-information specifying what are the current versions of all components each registered application requires;

the update monitoring process further operating to compare the downloaded meta-information with information obtained on the client machine to identify any registered application for which an update should be performed and to send a notification that an update should be performed to each such identified registered application;

wherein each registered application has programming operable to receive a notification from the process running on the client machine and to cause an update to be performed in response to the notification.

2. The system of claim 1, wherein the programming in each registered application operable to receive a notification and to cause an update to be performed is a shared, self-updating component.

3. The system of claim 2, wherein the shared component is operable to interact with an application user to determine whether an available update will be downloaded and installed.

4. The system of claim 1, wherein the meta-information from each server is received in the form of an XML (Extensible Markup Language) file.

5. The system of claim 1, wherein the notification from the process is received through data stored in the local database.

6. A method for providing updating information for computer program components on a client machine operable to be connected to web sites on the Internet, the method comprising:

receiving a registration from each of multiple computer program applications installed on the client machine and recording registration information from each registered application in a local database;

downloading first meta-information periodically from a first remote server over the Internet through a process running on the client machine independently of the execution of any of the registered applications, the location of the first meta-information and the location of the first remote server being obtained by the process from registration information for a first registered application in the local database; and determining whether a first update is available for the first application by comparing the downloaded first meta-information with information on the client machine, and if a first update is available, providing a first notification for the first application.

7. The method of claim 6, further comprising:

downloading second meta-information periodically from a second remote server over the Internet through the process independently of the execution of any of the registered applications, the location of the second meta-information and the location of the second remote server being obtained by the process from registration information for a second registered application in the local database; and determining whether a second update is available for the second application by comparing the downloaded second meta-information with information on the client machine, and if a second update is available, providing a second notification for the second application.

8. The method of claim 6, further comprising:

responding in the first application to the first notification by notifying a user running the first application and downloading and installing the first update from the first server in response to an action by the user requesting the download and installation.

9. A method for providing updating information for computer program components on a client machine operable to be connected to web sites on the Internet, the method comprising:

receiving a registration from each of multiple computer program applications installed on the client machine and recording registration information from each registered application in a local database;

downloading meta-information periodically from a remote server over the Internet through a process running on the client machine independently of the execution of any of the registered applications, the meta-information being on a web site known to the process or at a location provided to the process from a known web site; and determining whether an update is available for the application by comparing the downloaded meta-information with information on the client machine, and if an update is available, providing a notification for the first application.

10. A computer program product, tangibly stored on a computer-readable medium, for providing updates for computer program components on a client machine operable to be connected to web sites on the Internet, the product comprising instructions operable to:

execute as an update monitoring process on a client machine, the process being operable to maintain a local database of application-related information, to receive registration information from, and thereby register, multiple computer program applications installed on the client machine, and to maintain received registration information in the local database;

provide data from one or more servers remote from the client machine, each server and being operable to communicate with the client machine over the Internet; and maintain on each server meta-information concerning at least one of the multiple registered applications;

the update monitoring process further being operable to be executed periodically and at that time download from one or more of the servers, according to what applications are registered with the process, meta-information specifying what are the current versions of all components each registered application requires;

the update monitoring process further being operable to compare the downloaded meta-information with information obtained on the client machine to identify any registered application for which an update should be performed and to send a notification that an update should be performed to each such identified registered application;

wherein each registered application has programming operable to receive a notification from the process running on the client machine and to cause an update to be performed in response to the notification.

11. The product of claim 10, wherein the programming in each registered application operable to receive a notification and to cause an update to be performed is a shared, self-updating component.

12. The product of claim 11, wherein the shared component is operable to interact with an application user to determine whether an available update will be downloaded and installed.

13. The product of claim 10, wherein the meta-information from each server is received in the form of an XML (Extensible Markup Language) file.

14. The product of claim 10, wherein the notification from the process is received through data stored in the local database.

15. A computer program product, tangibly stored on a computer-readable medium, for providing updating information for computer program components on a client machine operable to be connected to web sites on the Internet, the product comprising instructions operable to cause a client machine to:

receive a registration from each of multiple computer program applications installed on the client machine and recording registration information from each registered application in a local database;

execute a background update monitoring process, the process running on the client machine independently of the execution of any of the registered applications;

download first meta-information periodically from a first remote server over the Internet through the process, the location of the first meta-information and the location of the first remote server being obtained by the process from registration information for a first registered application in the local database; and determine whether a first update is available for the first application by comparing the downloaded first meta-information with information on the client machine, and if a first update is available, providing a first notification for the first application.

16. The product of claim 15, further comprising instructions to:

download second meta-information periodically from a second remote server over the Internet through the process independently of the execution of any of the registered applications, the location of the second meta-information and the location of the second remote server being obtained by the process from registration information for a second registered application in the local database; and determine whether a second update is available for the second application by comparing the downloaded second meta-information with information on the client machine, and if a second update is available, providing a second notification for the second application.

17. The product of claim 15, further comprising instructions to:

respond in the first application to the first notification by notifying a user running the first application and downloading and installing the first update from the first server in response to an action by the user requesting the download and installation.

18. A computer program product, tangibly stored on a computer-readable medium, for providing updating information for computer program components on a client machine operable to be connected to web sites on the Internet, the product comprising instructions operable to cause a client machine to:

receive a registration from each of multiple computer program applications installed on the client machine and recording registration information from each registered application in a local database;

download meta-information periodically from a remote server over the Internet through a process running on the client machine independently of the execution of any of the registered applications, the meta-information being on a web site known to the process or at a location provided to the process from a known web site; and determine whether an update is available for the application by comparing the downloaded meta-information with information on the client machine, and if an update is available, providing a notification for the first application.

19. A method for updating computer program components on a client machine operable to be connected to web sites on the Internet, the method comprising:

receiving a registration in an update monitoring process from each of multiple computer program applications installed on the client machine and recording registration information from each registered application in a local database;

downloading meta-information periodically from one or more remote servers over the Internet through the monitoring process and updating the local database with information from the downloaded meta-information, the monitoring process running on the client machine independently of the execution of any of the registered applications; and determining in the monitoring process that an update is available for a first registered application by comparing the downloaded meta-information with information on the client machine, and if an update is available, causing the update to be downloaded and installed.

20. The method of claim 19, wherein the process finds the meta-information at one or more locations identified in registration information provided by the registered applications.

21. The method of claim 19, wherein the process finds the meta-information at one or more locations known to the process or at one or more locations provided to the process from one or more known web sites.

22. The method of claim 19, wherein the information on the client machine comprises information in a local database and information maintained by a local file system.

23. The method of claim 19, further comprising:

examining the local database to determine whether the available update is to be downloaded and installed without user intervention and, if so, causing the available update to be automatically downloaded and installed.

24. A computer program product, tangibly stored on a computer-readable medium, for updating computer program components on a client machine operable to be connected to web sites on the Internet, the product comprising:

computer program instructions implementing an update monitoring process operable to run on a client machine connected to web sites on the Internet, the instructions comprising instructions to:

receive a registration from each of multiple computer program applications installed on the client machine, thereby recognizing each such application as a registered application;

record registration information from each registered application in a local database;

download meta-information periodically from one or more remote servers over the Internet and update the local database with information from the downloaded meta-information while the monitoring process runs on the client machine independently of the execution of any of the registered applications; and determine that an update is available for a first registered application by comparing the downloaded meta-information with information on the client machine, and if an update is available, cause the update to be downloaded and installed.

25. The product of claim 24, the instructions implementing the update monitoring process further comprising instructions to:

examine the local database to determine whether the available update is to be downloaded and installed without user intervention and, if so, cause the available update to be automatically downloaded and installed.

* * * * *

UNITED STATES PATENT AND TRADEMARK OFFICE
CERTIFICATE OF CORRECTION

PATENT NO. : 6,711,557 B1
DATED : March 23, 2004
INVENTOR(S) : Murugappan Palaniappan It is certified that error appears in the above-identified patent and that said Letters Patent is hereby corrected as shown below:

<u>Title page,</u>
Item [56], References Cited, OTHER PUBLICATIONS, "Huang, Y.W. replace "18th International Conference on 26 May 29, 1998" with -- 18th International Conference on 26-29 May 1998 --

Signed and Sealed this

Fifteenth Day of June, 2004

JON W. DUDAS
*Acting Director of the United States Patent and Trademark Office*